United States Patent [19]

Bolick, Jr.

[11] E Re. 29,058

BEST AVAILABLE COPY

[45] Reissued Nov. 30, 1976

[54] MINIATURE CASSETTE ADAPTER APPARATUS AND CASSETTE TAPE RECORDER-REPRODUCER

[75] Inventor: Fred C. Bolick, Jr., DeKalb County, Ga.

[73] Assignee: Lanier Electronic Laboratory, Inc., Atlanta, Ga.

[22] Filed: Apr. 14, 1975

[21] Appl. No.: 567,983

Related U.S. Patent Documents

Reissue of:

[64] Patent No.: 3,800,321
Issued: Mar. 26, 1974
Appl. No.: 219,960
Filed: Jan. 24, 1972

[52] U.S. Cl. ..... 360/94
[51] Int. Cl.[2] ..... G11B 23/04
[58] Field of Search ..... 360/94, 85, 96, 93, 360/132; 242/55.19 A, 197–200

[56] References Cited

UNITED STATES PATENTS

| | | | |
|---|---|---|---|
| 3,377,437 | 4/1969 | Probst | 360/94 |
| 3,485,963 | 12/1969 | Murata | 360/94 |
| 3,521,010 | 7/1970 | Sato | 360/94 |
| 3,531,127 | 9/1970 | Harper | 360/94 |
| 3,624,310 | 11/1971 | Mathey | 360/94 |
| 3,632,894 | 1/1972 | Bretschneider | 360/94 |
| 3,644,684 | 2/1972 | Tsuji | 360/94 |
| 3,821,808 | 6/1974 | Wada et al. | 360/94 |

*Primary Examiner*—Alfred H. Eddleman
*Attorney, Agent, or Firm*—Jones, Thomas & Askew

[57] ABSTRACT

Adapter apparatus to be received within the cassette holder of a conventional cassette record-playback apparatus to permit miniature tape cassettes to be used in the record-playback apparatus, and record-playback apparatus useful with said adapter apparatus. The adapter apparatus is configured to be received within the location normally occupied by a tape cassette of standard size and configuration, and includes a receptacle into which a miniature tape cassette may be placed. The adapter includes drive apparatus which is selectively engaged to be driven by the capstan and pressure roller of the record-playback apparatus and which drives the forward takeup reel of the miniature tape cassette. One or more magnetic heads are provided in the adapter apparatus for engagement with the tape carried in the miniature cassette.

10 Claims, 5 Drawing Figures

MINIATURE CASSETTE ADAPTER APPARATUS AND CASSETTE TAPE RECORDER-REPRODUCER

Matter enclosed in heavy brackets [ ] appears in the original patent but forms no part of this reissue specification; matter printed in italics indicates the additions made by reissue.

This invention relates in general to tape record-playback apparatus and in particular to tape record-playback apparatus designed for use with tape cassettes of a predetermined standard size and which enables miniature tape cassettes to be used in such apparatus.

Although magnetic tape recording and tape record-playback apparatus have been popular for a number of years, the popular appeal of such apparatus has been enhanced by the introduction of tape record-playback apparatus in which the recording tape is enclosed within a cartridge, cassette, or other housing which enables the recording tape to be rapidly loaded and unloaded from the record-playback apparatus without need to thread the recording tape from a supply reel through the record-playback gate and thence to a takeup reel. Although reel-to-reel tape recorders are still used for a number of applications, tape record-playback apparatus utilizing cassette tape has become increasingly popular especially in applications involving relatively compact record-playback apparatus.

Many tape record-playback devices use a generally standardized type of tape cassette popularly known as the "C—60" or "C—90", depending on the amount of tape provided in the cassette, and referred to herein as the "C—60" tape cassette. This standard cassette, as is known to those skilled in the art, encloses a pair of tape winding members and has provision for capstan tape drive to provide the regulated tape speed desirable for high-quality audio reproduction. Another tape cassette which is commerciallly available is popularly known as the miniature cassette or "mini-cassette", the miniature cassette also contains a pair of tape winding members, but is substantially smaller in overall size than the aforementioned C—60 cassette and contains no provision for capstan drive of the tape. The miniature cassettes find substantial popularity in combination with small record-playback apparatus of the type which can be hand-held in its entirety, for example, and which are popularly used as a kind of verbal memo pad wherever it is desired to have available a compact, lightweight tape recordplayback apparatus that can be carried in a person's pocket or briefcase.

A major disadvantage with the miniature cassette is the fact that neither the miniature cassette nor the tape record-playback apparatus designed for its use are compatible with the more widely available record-playback apparatus designed to accept the C—60 tape cassette. Accordingly, the user of a miniature cassette record-playback apparatus, who may be using such apparatus for recording purposes while away from his office, must provide special miniature cassette playback or transcription apparatus in his office, whereas his standard office dictation equipment or another readily available record-playback apparatus may be designed to accept the standard C—60 cassette. This user of the miniature cassette thus pays the price of requiring two separate and non-compatible record-playback machines at the playback or transcription location, as a price of enjoying the compactness and portability afforded by record-playback apparatus designed to accept the miniature cassette.

Accordingly, it is an object of the present invention to provide improved tape record-playback apparatus.

It is another object of the present invention to provide apparatus which enables a miniature cassette to be used in conjunction with record-playback apparatus designed for use with larger cassettes.

It is still another object of the present invention to provide adapter apparatus which enables a miniature cassette of the type not intended for capstan tape drive to be used in record-playback apparatus of the type employing a tape capstan and pressure roller tape drive mechanism.

It is a further object of the present invention to provide apparatus which enables a miniature cassette to be used in record-playback apparatus designed to accept cassettes having a larger overall configuration.

It is another object of the present invention to provide record-playback apparatus which readily accepts either a tape cassette of standard large size or an adapter to receive a miniature cassette.

Many of the other objects and attendant advantages of the present invention will become more readily apparent from the following description of a preferred embodiment thereof including the drawing, wherein.

Figure 1:
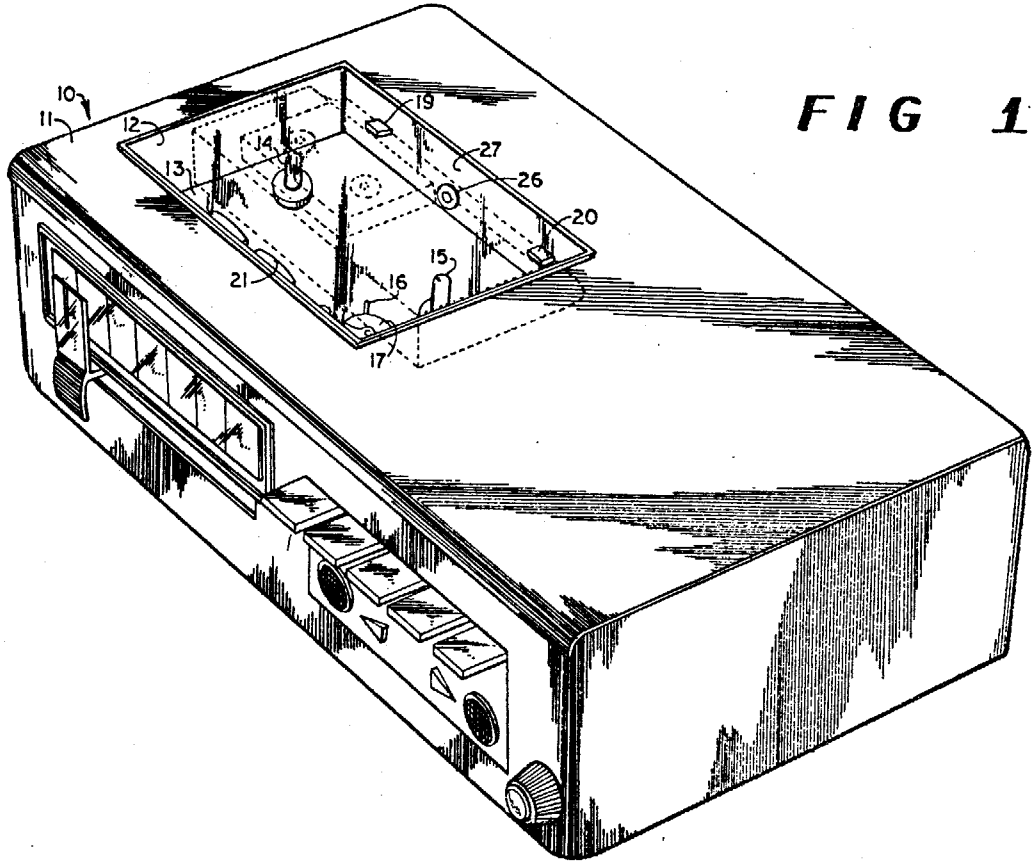
FIG. 1 shows a pictorial view of a tape record-playback apparatus according to an embodiment of the present invention, including an adapter for miniature cassettes shown in phantom.

Stated generally, the present invention comprises an adapter support configured to be received within the tape cassette receptacle of a record-playback apparatus in lieu of the standard tape cassette normally disposed therein. The adapter support receives a miniature tape cassette and includes both forward and reverse tape motion drive mechanisms which are automatically operatively coupled with drive mechanisms of the record-playback apparatus. The adapter support carries a tape transducer head positioned to contact the tape of a miniature cassette disposed therein and connected through a disconnectable arrangement with the audio circuitry of the record-playback apparatus. The present invention also comprises record-playback apparatus having a cassette receptacle configured to receive a cassette of standard size and also having an audio circuit connective device for mating connection with a miniature cassette adapter disposed in the cassette receptacle.

Considered with respect to the embodiment as shown in the Figures, a record-playback apparatus is shown generally at 10 and including a housing 11 in which a receptacle 12 is disposed to receive a tape cassette such as a C—60 or the like, which is substantially larger than a miniature cassette. Extending in a generally perpendicular direction with respect to the floor 13 of the receptacle 12 is a tape rewind drive spindle 14 and a tape forward drive spindle 15, such spindles being connected through appropriate drive mechanisms and control apparatus in a manner well-known to those skilled in the art. A tape drive capstan 16 extends perpendicularly upwardly from floor 13 at a location adjacent the path of travel of tape in a standard tape cassette normally received within the receptacle 12, and a rotatable pressure roller 17 is mounted on a bracket 18 for selective movement into and out of confronting engagement with the capstan 16 and with the recording tape which conventionally is pinched between the capstan and the pressure roller for tape-record or playback motion. The receptacle 12 includes one or more cassette retention support devices, such as the members 19 and 20, beneath which the conventional standard cassette is received for retention in the receptacle.

The record-playback apparatus 10 conventionally includes one or more magnetic transducer heads denoted at 21 which are typically mounted on a movable support member (not shown) to be selectively positionable into and out of transducing relation with the tape of a cassette normally disposed in the receptacle 12.

An electrical connective member 26 is disposed at a suitable location within the receptacle 12, such as in the rear wall 27 of the receptacle 12 in substantially flush relation therewith. This connective member 26 is connected in suitable electrical relation with the audio circuitry of the record-playback apparatus, such as by being electrically in parallel with the playback head 21 or by another type of connection appropriate for the purpose as described below.

Figure 2:
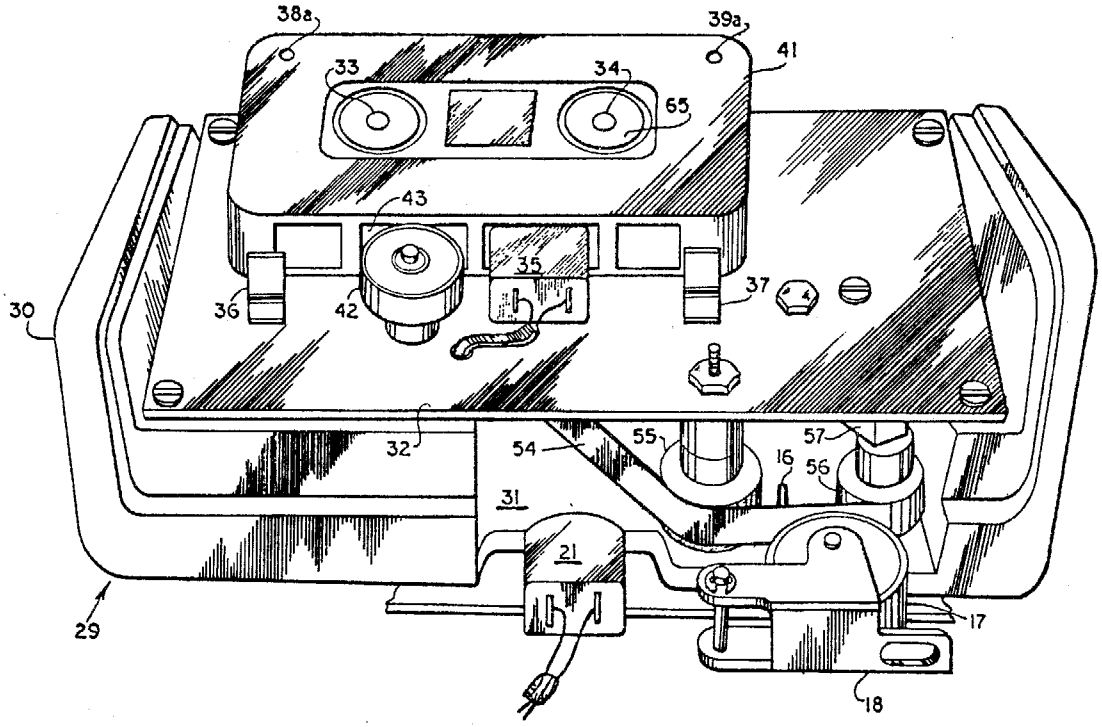
FIG. 2 shows a pictorial view of a miniature cassette adapter according to an embodiment of the present invention and positioned for use with the record-playback apparatus shown in FIG. 1.
Figure 3:
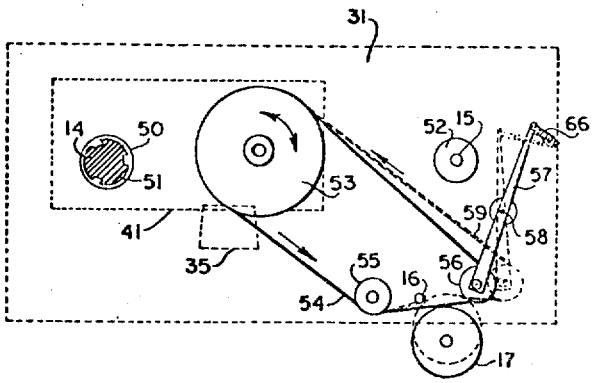
FIG. 3 is a partial plan view of the miniature cassette adapter of FIG. 2, showing the drive mechanism of the adapter.
Figure 4:
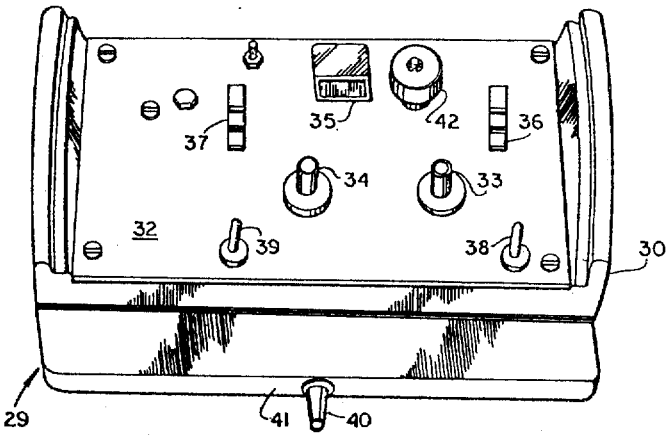
FIG. 4 shows a rear pictorial view of the adapter shown in FIG. 2.

Turning next to FIGS. 2, 3, and 4, there is shown an adapter apparatus 29 according to the disclosed embodiment of the present invention and including a support housing 30 having an overall external size and shape to enable the housing to be received within a tape cassette receptacle 12. The support housing 30 has a bottom surface 31 and carries a base member 32 in spaced apart relation with the bottom surface. Extending upwardly from the base member 32 and mounted for rotation are an adapter tape rewind spindle 33 and an adapter tape forward spindle 34, with the spacing between the spindles 33 and 34 being substantially identical to the spacing between the tape winding members of a miniature cassette 41 shown in FIG. 2 disposed in the adapter apparatus. An adapter transducing head 35 is mounted on the base member 32 in position to operatively contact the recording tape of a miniature cassette 41 disposed on the spindles 33 and 34. Retention of the miniature cassette 41 on the base member of the adapter is accomplished through a pair of resilient members such as leaf springs 36 and 37, which urge the miniature cassette against a corresponding pair of posts 38 and 39. It will be understood by those skilled in the art that a miniature cassette 41, as shown in FIG. 2, is inserted in the adapter apparatus of the disclosed embodiment by placing the forward or tape-exposing side of the miniature cassette against the transducer 35 and the springs 36 and 37, and then lowering the miniature cassette to engage the adapter spindles 33 and 34 with the corresponding tape winding members of the miniature cassette and to insert the posts 38 and 39 into the corresponding guide holes 38a and 39a provided on the conventional miniature cassette. A fixed guide member 42 may also be mounted in spaced-apart relation with the base member 32 for positioning engagement by an opening 43 in the front of the miniature cassette 41.

Electrical connection with the adapter transducing head 35 is established by a shielded cable or another suitable electrical connector extending between the adapter head 35 and an electrical connective member 40 extending outwardly from the rear wall 41 of the adapter. The connective member 40 is of a type and is positioned to mate with the connective member 26 on the rear wall 27 of the receptacle 12, so that electrical connection of the adapter head 35 with the audio circuitry of the record-playback apparatus 10 is conveniently accomplished by the act of inserting the adapter into the receptacle 12.

Figure 5:
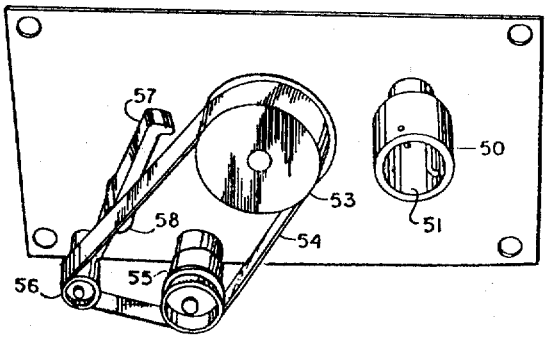
FIG. 5 shows a view of the drive mechanism within the interior of the adapter shown in FIG. 2.

Turning next to a consideration of the drive mechanism for the first embodiment of the miniature cassette adapter, as best shown in FIGS. 3 and 5, the adapter rewind spindle 33 is connected to a spindle extension shaft 50 which extends downwardly from the base 32 to a position proximate an opening 51 disposed in the bottom surface 31 of the adapter. The opening 51 is positioned on the bottom surface 31 so that insertion of the adapter into the receptacle 12 causes the rewind spindle 14 of the record-playback apparatus 10 to pass through the opening 51 into rotational driving engagement with the extension shaft 50. It will be appreciated that the extension shaft 50 includes at least a hollow portion into which the rewind spindle 14 is received for rotational driving engagement. The bottom surface 31 of the adapter includes a second opening 52 through which the forward spindle 15 of the record-playback apparatus passes when the adapter is received within the receptacle 12; however, the opening 52 merely accommodates the passage of the forward spindle 15, since the adapter apparatus makes no mechanical or other interconnection with the forward spindle in the embodiment disclosed herein.

The adapter foward drive spindle 34 is connected beneath the base member 32 with a drive wheel 53. An endless drive belt 54 extends around the drive wheel 53, an idler wheel 55, and a clutch wheel 56. The clutch wheel 56 is mounted for rotation on an end of an arm 57 which is pivotally mounted at 58. It can be seen that the arm 57 can assume a first position shown in solid lines in FIG. 3, in which the drive belt 54 is slack and lacks sufficient tension to make substantial driving engagement with the drive wheel 53; and can be moved to a second position, shown in broken lines in FIG. 3, in which the clutch wheel 56 tensions the drive belt 54 for driving engagement with the drive wheel 53.

It can be seen from the FIGS. 2 and 3 that the clutch wheel 56 is positioned in the adapter apparatus to be in partial confronting relationship with the pressure roller 17 of the record-playback apparatus 10 in which the adapter apparatus 29 is inserted. Thus, movement of the pressure roller 17 in a direction towards the capstan 16 causes the pressure roller to displace the clutch wheel 56 in a direction to apply tension to the drive belt 54.

Considering the operation of the disclosed embodiment of the present invention, it is assumed that a person desires to transcribe a previously-recorded miniature cassette using a record-playback apparatus 10 designed to receive standard-size cassettes. The adapter 29 is inserted into the receptacle 12 so that the rewind spindle 14 engages the extension shaft 50 of the adapter rewind spindle 33 and so that the connective member 40 makes electrical contact with the connective member 26 on the rear wall 27 of the receptacle. As best shown in FIG. 2, the bottom surface 31 of the adapter is configured so that the adapter can fit around the transducing heads 21 and other structure of the record-playback apparatus 10. The miniature cassette is then inserted on the base member 32 of the adapter 29 with the adapter rewind spindle 33 and forward spindle 34 extending through the respective tape winding members of the miniature cassette and with the adapter head 25 in transducing contact with the tape. Assuming that the tape in the miniature cassette was previously rewound to a starting position, the controls of the recorder-transcriber apparatus 10 are manipulated in the conventional manner to cause the pressure roller 17 to move toward the capstan 16 and the clutch wheel 56. It can be seen especially from FIG. 3 that the drive belt 54, which was inserted between the capstan 16 and the pressure roller 17 when the adapter 26 was inserted into the receptacle 12, is now pinched between the capstan and the pressure roller so that capstan rotation causes the drive belt to be moved in much the same manner as recording tape is normally moved by operation of the capstan and the pressure roller.

At the same time, the movement of the pressure roller 17 toward the clutch wheel 56 causes the clutch wheel to be displaced by a pivotal movement of the arm 57 to a position which applies tension to the drive belt 54, as shown in broken lines at 59 in FIG. 3. The movement of the drive belt 54 by the capstan and pressure roller thus is applied to the drive wheel 53 to rotate the adapter forward spindle 34 and thus to cause the tape in the miniature cassette to be moved along the adapter head 35. Since the recording of the information on the miniature cassette previously occurred by driving the tape winding member 65 of that cassette at a constant rotational velocity, thereby resulting in tape moving past the recording head at nonuniform velocity, it will be appreciated that the diameter of the drive wheel 53 is chosen with respect to the diameter and rotational velocity of the capstan 16 to cause the tape winding member 65 to rotate at the same aforementioned constant recording rotational velocity.

If it is desired to rewind the tape on the miniature cassette, the controls of the recorder-transcriber 10 are operated in the conventional manner to retract the pressure roller 17 from contact with the capstan 16 and the drive belt 54 and to permit the clutch wheel 56 to release tension of the drive belt 54. The controls of the recorder-transcriber 10 now may be operated to supply reverse-rewind rotation to the rewind spindle 14, and through the extension shaft 50 to the adapter rewind spindle 33. The relaxed tension of the drive belt 54 permits the drive wheel 53 to slip with respect to the drive belt, so that reverse or rewinding rotation of the miniature cassette tape wind member 65 is not substantially impeded. A resilient device such as a spring 66 can be connected at the end of the arm 57 remote from the clutch wheel 56, to insure that the drive belt 54 is relaxed when the pressure roller 17 is withdrawn, although the use of a spring 66 has been found not to be necessary in working embodiments of the present invention.

Although the invention has been described thus far with respect to playback of a miniature cassette which was previously recorded on apparatus provided especially for use with such cassettes, it will be apparent to those skilled in the art that adapter apparatus according to the present invention can also be used for recording on miniature cassettes through the expedient of applying recording signals to the adapter head 35, and, if desired for re-recording of previously-recorded miniature cassettes, an erase head positioned in the conventional manner.

It will be understood that the foregoing relates only to a preferred embodiment of the present invention, and that numerous alterations and modifications may be made therein without departing from the spirit and the scope of the present invention as defined in the appended claims.

What is claimed is:

1. Adapter apparatus for use with a tape record-playback apparatus of the type having a receptacle for receiving a tape cassette and additionally having a first powered drive means for selectively driving a tape supply member of the tape cassette in a reverse [ rewind ] *winding* direction, and tape movement means including *a second powered drive means for selectively driving a tape receiving member of the tape cassette in a forward winding direction*, a rotatable tape drive capstan positioned to be in proximity to a portion of the tape in the tape cassette, and a pressure roller for selective engagement with said tape portion, said tape movement means *being* selectively operative to move tape in the tape cassette in a forward *winding* direction; said adapter apparatus comprising:

support means externally configured to be operatively receivable in said tape cassette receptacle of a record-playback apparatus in place of a tape cassette normally received therein;

said support means including means for removably receiving a miniature tape cassette which is substantially smaller in external configuration than a tape cassette normally operatively received in said receptacle and which includes [ at least one ] *a* tape *forward* winding member operative to wind tape in a forward direction *and a tape reverse winding member operative to wind tape in a reverse direction;* [ and ]

*a pair of drive members positioned on said miniature cassette receiving means for rotational engagement with such tape reverse winding member and tape forward winding member of a miniature tape cassette received on said support means;* first drive means associated with said support means for operative engagement with *the one of* said [ one tape winding ] *drive* [ member ] *members which rotationally engages such tape forward winding member* of a miniature tape cassette received on said support means and selectively operative to be driven by said tape movement means to establish movement coupling interconnection between the tape movement means of said record-playback apparatus and said one tape winding member of such miniature tape cassette to selectively impart forward tape winding movement to said one tape winding member [.] *; and*

*second drive means associated with said support means and operatively connected between said first powered drive means of such tape record-playback apparatus and the other of said drive members on said miniature cassette receiving means to transmit reverse winding movement of the first powered drive means to the tape reverse winding member of such miniature tape cassette received on said support means.*

2. Adapter apparatus for use with a tape record-playback apparatus of the type having a receptacle for receiving a tape cassette and additionally having tape movement means including a first powered drive means for selectively driving a tape supply member of the tape cassette in a reverse rewind direction, a rotatable tape drive capstan positioned to be in proximity to a portion of the tape in the tape cassette, and a pressure roller for selective engagement with said tape portion; said adapter apparatus comprising:

support means externally configured to be operatively receivable in said tape cassette receptacle of a record-playback apparatus in place of a tape cassette normally received therein;

said support means including first and second spindle means for engagement with corresponding first and second tape winding members of a tape cassette;

first drive means on said support means operative to be selectively driven in response to rotation of the tape drive capstan of the record-playback apparatus to selectively rotate one of said spindle means at a predetermined speed; and second drive means on said support means for disposition in motion coupling relation between the first powered drive means of the record-playback apparatus and the other of said spindle means.

3. Apparatus as in claim 2, further comprising:

transducing means positioned on said support means in signal transducing relation with the tape of a tape cassette disposed on said first and second spindle means;

first signal transfer means on said support means in signal communication with said transducing means;

second signal transfer means positioned within the receptacle on the record-playback apparatus and operative to receive signals from said first signal transfer means; and said first signal transfer means being disposed on said support means in position to be placed in signal transfer relation with said second signal transfer means when said support means is received in said receptacle of the record-playback apparatus.

4. Adapter apparatus for use with a tape record-playback apparatus of the type having a receptacle for receiving a tape cassette and additionally having [ tape movement means including ] a first powered drive means for selectively driving a tape supply member of the tape cassette in a reverse [ rewind ] *winding* direction, *a second powered drive means for selectively driving a tape receiving member of the tape cassette in a forward winding direction*, a rotatable tape drive capstan positioned to be in proximity to a portion of the tape in the tape cassette, and a pressure roller for selective engagement with said tape portion; said adapter apparatus comprising:

support means externally configured to be operatively receivable in said tape cassette receptacle of a record-playback apparatus in place of a tape cassette normally received therein;

said support means including means for removably receiving a miniature tape cassette which is substantially smaller in external configuration than a tape cassette normally operatively received in said receptacle and which includes [ at least one ] *a* tape *forward* winding member operative to wind tape in a forward direction *and a tape reverse winding member* operative to wind tape in a reverse direction; [ and ]

first drive means associated with said support means for [ operative ] *operatively* [ engagement with said one ] *imparting forward movement to* tape [ winding member of ] *in* a miniature tape cassette received on said support means and selectively operative *for movement coupling interconnection with the tape drive capstan of said record-playback apparatus* to be driven in response to rotation of the tape drive capstan of said record-playback apparatus to [ establish movement coupling interconnection between said capstan and said one tape winding member of such miniature tape cassette to selectively ] impart *said* forward [ tape winding ] movement to said [ one ] tape [ winding member. ] *; and*

*second drive means associated with said support means and operatively connected between the first powered drive means of said record-playback apparatus and said tape reverse winding member of such miniature tape cassette received on said support means to transmit reverse winding movement of the first powered drive means to said tape reverse winding member of such miniature tape cassette.*

[ 5. Apparatus as in claim 4, further comprising:

second drive means associated with said support means and operatively connected between the first powered drive means of said record-playback apparatus and a second tape winding member of a miniature tape cassette received on said support means. ]

6. Apparatus as in claim [ 5 ] *4*, wherein:

said second drive means is associated with said support means to be positioned in connective alignment with the first powered drive means of said record-playback apparatus when said support means is received in the cassette receptacle.

7. Apparatus as in claim 6, wherein said first drive means comprises:

spindle means rotatably mounted on said support means for engagement with said [ one ] tape *forward* winding member of a miniature tape cassette received in said support means; and an endless drive belt means in selective rotation driving relation with said spindle means;

said drive belt means being positioned in said support means to be [ received in driven relation with ] *driven in response to rotation of* the capstan of said record-playback apparatus in which said adapter apparatus is disposed.

8. Apparatus as in claim 4, further comprising:

means associated with said support means and positioned to be displaced by selective engagement of the pressure roller of the record-playback apparatus, said means being responsive to displacement by the pressure roller relative to the capstan to accomplish said selective movement coupling interconnection of first drive means.

[ 9. Apparatus as in claim 8, further comprising:

second drive means associated with said support means and operatively connected between the first powered drive means of said record-playback apparatus and a second tape winding member of a miniature tape cassette received on said support means. ]

10. Apparatus as in claim 8, wherein:

said first drive means comprises drive belt means disposed in said support means to be positioned between the capstan and the pressure roller when said support means is received in the cassette receptacle of a record-playback apparatus;

winding member engaging means disposed in said support means and positioned to drivingly engage said [ first ] tape *forward* winding member of a miniature tape cassette received therein; and said drive belt means being selectively operatively coupled with said winding member engaging means.

11. Apparatus as in claim 10, further comprising:

drive wheel means operatively connected with said winding member engaging means and having a drive belt surface along which said drive belt means passes for driving engagement;

selectively displaceable clutch pulley means along which said drive belt passes, said clutch pulley means being selectively displaceable to a first position wherein tension is applied to said drive belt means for driving engagement with said drive wheel means, and to a second position wherein tension is removed from said drive belt means to remove said drive wheel means from driving relation with said drive belt means.

*12. Adapter apparatus as in claim 1, wherein said first drive means is selectively operative either to a first state establishing said operative engagement between said tape movement means and said one drive member on said miniature cassette receiving means, or to a second state for terminating said operative engagement.*

* * * * *